March 3, 1970     M. I. TURNER, JR     3,498,008

DRESSING DEVICE FOR SPOT WELDING ELECTRODES

Filed July 10, 1967

INVENTOR
MILO I. TURNER, JR.

BY *[signature]*

ATTORNEY

United States Patent Office 3,498,008
Patented Mar. 3, 1970

3,498,008
DRESSING DEVICE FOR SPOT WELDING ELECTRODES
Milo I. Turner, Jr., 2011 E. Henrietta Road, Apt. 1, Rochester, N.Y. 14623
Filed July 10, 1967, Ser. No. 652,052
Int. Cl. B24b 5/18
U.S. Cl. 51—170    1 Claim

ABSTRACT OF THE DISCLOSURE

A device for dressing and cleaning the curved tips of spot welding electrodes including a grinding wheel having a curved surface normal to its axis of rotation, an annular guide for aligning the wheel coaxially at the end of an electrode, and an off-set drive arrangement to facilitate insertion of the wheel and guide between two opposed electrodes. In the preferred form, the wheel is rim mounted within the central aperture of a ring gear, and both end faces of the wheel are curved to constitute working surfaces.

Brief summary of the invention

This invention relates to a novel device for dressing and cleaning electrodes of spot welding machines, and, more particularly, but not exclusively, to a novel device of this type especially suited for use with high speed automatic spot welders wherein the electrodes are mounted in close spaced opposition.

A common problem in spot welding relates to wear and contamination of the working faces of the electrodes. It is especially acute in cases where the material being worked in highly conductive such as, for example, aluminum, but is also of concern with other materials. Heretofore, the usual practice has been simply to replace the electrodes periodically, or to work them by hand with emery cloth or files. These procedures have been time consuming, and, in cases where the electrodes have been worked without removing them from the welders, it has been difficult to maintain proper curvature of their working faces for optimum welding performance.

Briefly, the device of the present invention includes an abrasive wheel having a radial face curved to conform to the optimum electrode curvature, an annular guide coaxial with and closely spaced from the curved radial face of the wheel for loosely aligning the wheel with an electrode, and an off-set drive arrangement for driving the wheel without interfering with its insertion between two opposed electrodes in coaxial alignment with them.

In the preferred form of the invention, both opposed end faces of the wheel are shaped to conform to the desired curvature of the welding electrodes, and the wheel is mounted within the central aperture of a ring gear, thereby providing a very thin arrangement permitting the wheel to be inserted between a pair of very closely spaced electrodes, and used to dress both electrodes simultaneously or in quick succession, without the need to invert the dressing device when switching from one electrode to the other.

Detailed description

Representative embodiments of the invention will now be described in conjunction with the accompanying drawing wherein.

Figure 1:
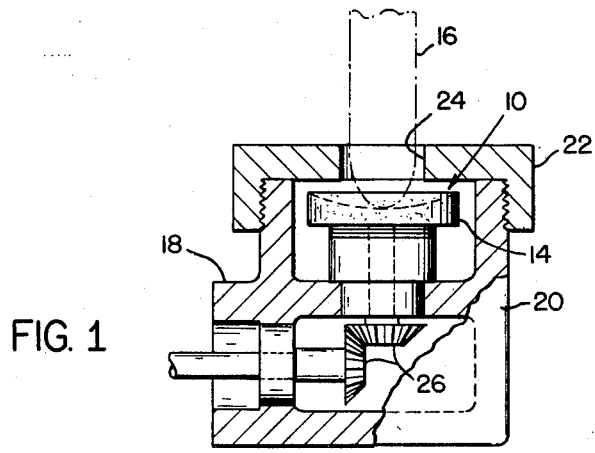
FIGURE 1 is a cross-sectional view partly in schematic form of a dressing device according to a first embodiment of the invention.

A dressing device according to a first embodiment of the invention, as shown in FIGURE 1, includes an abrasive wheel 10 fixed on the end of a rotatable shaft 12 and having its radial face 14 curved to conform to the optimum curvature for a particular spot welding electrode to be dressed. The shaft 12 is supported by and extends from a housing structure 18, which may be of any desired kind. A cup-like support member 20 is fixed to the housing 18, and extends therefrom, outwardly spaced from the wheel 10, to a plane adjacent to the end face 14. An annular guide 22 is fixed, preferably removably, at the end of the support member 20 for loosely aligning the wheel 10 with the electrode 16. The aperture 24 in the guide 22 is larger than the diameter of the electrode 16 to permit a small degree of lateral motion of the wheel 10 relative to the electrode, thereby to avoid the creation of a blind spot on the electrode corresponding to the center of the wheel 10. As shown, the wheel 10 is driven through a bevel gear set 26 to minimize the overall length of the structure that must be aligned with the electrode 16 in operation, thereby to permit dressing of the electrode 16 without removing it from its regular mount on the spot welder.

The embodiment of the invention shown in FIGURE 1 is well suited for manual cleaning and dressing of spot welding electrodes, and may be readily mounted on any convenient drive device. In certain automatic spot welding equipment, however, the opposed electrodes are so closely spaced, even in their open position, that the arrangement shown cannot be easily applied without either modifying the welding equipment or removing the electrodes. The embodiment of the invention illustrated in FIGURES 2 and 3 is intended to provide a device of minimum thickness, which can be readily used either by manual application or by automatic programming, for dressing electrodes on almost any commercial spot welder.

Figure 2:
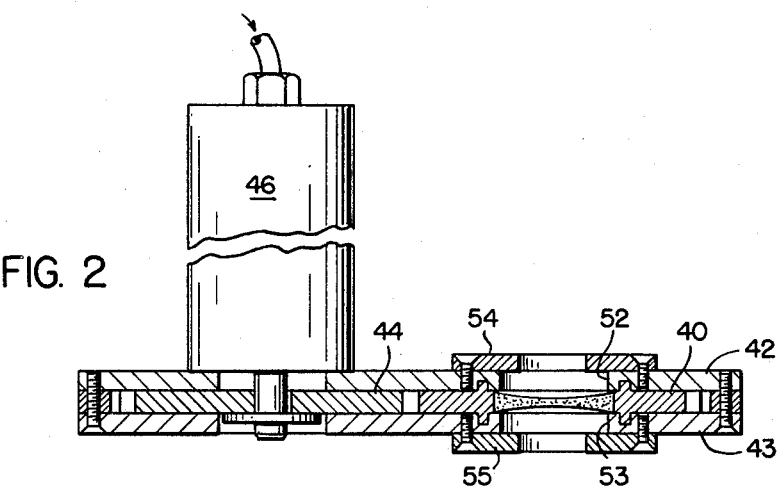
FIGURE 2 is a cross-sectional view partly in schematic form showing a dressing device according to a second embodiment of the invention.
Figure 3:
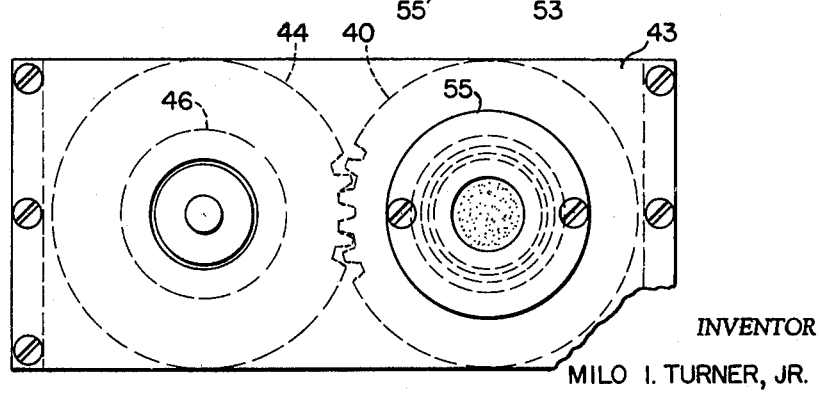
FIGURE 3 is a bottom view of the device shown in FIGURE 2.

The dressing device shown in FIGURES 2 and 3 includes a ring gear 30 mounted for rotation between a pair of plates 42 and 43, respectively, and in mesh with a drive gear 44, which is also mounted between the plates 42 and 43. The drive gear 44 is fixed to any desired drive device such as, for example, the air motor 46 illustrated. Any desired journalling arrangement may be provided. The bearing loads are not heavy, and convenient journalling may be accomplished by the simple flange-in-groove arrangement shown, with the plates 42 or 43 lined with low friction sheet material such as Teflon sheeting.

An abrasive wheel 48 is press fitted, or otherwise removably secured, within the central aperture of the ring gear 40. Preferably, both faces of the wheel 48 are curved in accordance with the shapes it is desired to maintain on the electrodes to be dressed. For single purpose uses, the plates 42 and 43 define apertures 52 and 53 coaxial with the axis of rotation of the ring gear 40 for guiding the wheel 48 into approximate coaxial alignment with the electrodes to be dressed. For more versatile application, as shown, additional annular guides 54 and 55 are removably secured to the plates 42 and 43, respectively. In this way, the device may be readily and quickly modified for use with different electrodes of various different diameters simply by changing the guides 54 and 55.

In operation, the plates 42 and 43 are simply inserted between the opposed electrodes of a spot welding machine to bring the abrasive wheel 48 into approximate alignment with the electrodes, and then the wheel 48 is applied to dress first one electrode and then the other with the required axial pressure and rotational speed, in accordance, usually, with the recommendations of the supplier of the abrasive.

What is claimed is:

1. A device for cleaning and dressing spot welding electrodes or the like comprising an abrasive wheel having a curved radial face, means mounting said wheel for rotation about an axis normal to its curved radial face, an annular guide having an aperture shaped loosely to receive a welding electrode, means mounting said guide adjacent to and spaced from the radial curved face of said wheel in coaxial alignment therewith, and a set of bevel gears for driving said wheel in rotation by power applied along an axis angularly spaced from the axis of rotation of said wheel, said wheel being fixed relative to one of said bevel gears and coaxially aligned therewith, a housing enclosing said bevel gears and mounting said guide at one end thereof, whereby said wheel can be inserted in operative relationship against the tip of a welding electrode which stands in close spaced opposition to another electrode.

References Cited

UNITED STATES PATENTS

| 1,046,075 | 12/1912 | Kelley. | |
| 2,851,009 | 9/1958 | Branvold | 144—28.72 |
| 2,188,126 | 1/1940 | Yerkey | 51—170 |
| 2,365,232 | 12/1944 | Wert | 51—170.2 |

FOREIGN PATENTS

| 273,979 | 6/1951 | Switzerland. |
| 853,470 | 11/1960 | Great Britain. |

JAMES L. JONES, Jr., Primary Examiner